April 20, 1954  V. H. BIELEFELD  2,675,781
BIRD PERCH
Filed Feb. 28, 1952

Inventor:
Victor H. Bielefeld
by H. J. Sanders
Attorney.

Patented Apr. 20, 1954

2,675,781

UNITED STATES PATENT OFFICE 2,675,781

BIRD PERCH

Victor H. Bielefeld, Chicago, Ill.

Application February 28, 1952, Serial No. 273,996

5 Claims. (Cl. 119—26)

This invention relates to bird furniture and more particularly to improvements in perches or roosts. This perch is intended for use by birds not confined to their cages but free to fly about the room as well as into and out of their cages more or less at will, the cage door being left open. The instant perch is one that may be termed "educational" as it will appeal to the bird instincts, particularly to those of the canary, the love bird and others of this type. It is known that these birds are favorably disposed toward certain colors, particularly white, silver color, the faintly bluish-white crystalline color of tin, etc. and parts of the instant perch are so colored as to attract the birds and make them feel at home, to dispel their natural feelings of timidity, aloofness, and fear or dread in the presence of humans.

It is also known that many birds are prone to admire their reflections; that they will, when possible, sit and watch reflections of themselves in mirrors or elsewhere, and the instant invention is so constructed and assembled that it may be readily attached to the frames of mirrors, glass-covered pictures, and certain types of wall mouldings, etc. to accommodate the birds which may then enjoy their surroundings and become quickly accustomed to their owners and, in fact, learn to desire their company.

A further object is to provide a perch that is so constructed as to provide means outside the cage that have appeal to the birds and which they will select to rest upon, the structure further being such that it will train or teach the birds to become "house broken" as random landing of the birds upon the house furniture, bric-a-brac etc. of the room with consequent spreading of litter will be avoided almost or quite completely, the instant perch having means for receiving bird droppings that do not drop to the floor or furnishings.

Other novel features and advantages of arrangement, construction and design comprehended by the invention are hereinafter more fully pointed out or made apparent from the following description of a preferred embodiment as illustrated in the accompanying drawing wherein like reference characters denote corresponding parts throughout.

Figure 1:
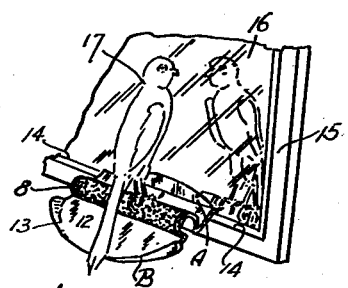
Fig. 1 is a view in elevational perspective, on a reduced scale, of a perch according to the invention illustrating one application thereof, the bird being shown using the perch which is applied to the frame of a mirror.
Figure 2:
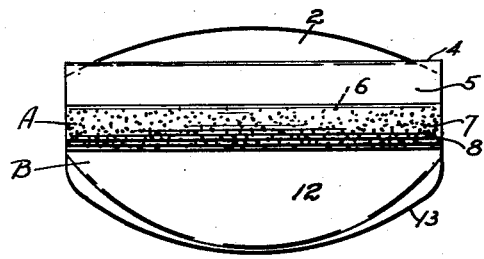
Fig. 2 is a top plan view of the perch.
Figure 4:
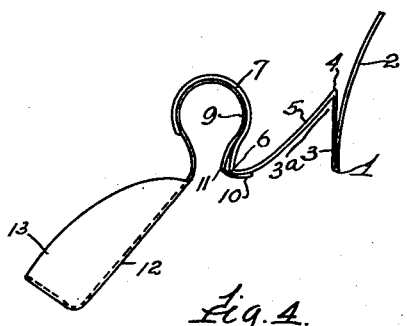
Fig. 4 is a side elevational view, enlarged, of the perch.
Figure 3:
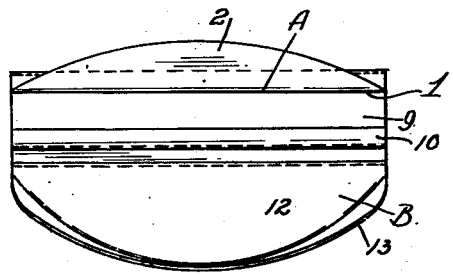
Fig. 3 is an inverted plan view of same.
Figure 5:
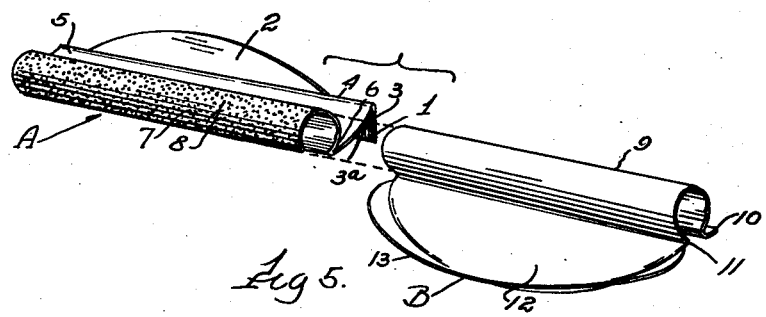
Fig. 5 is an exploded view, in perspective, of the perch.
Figure 6:
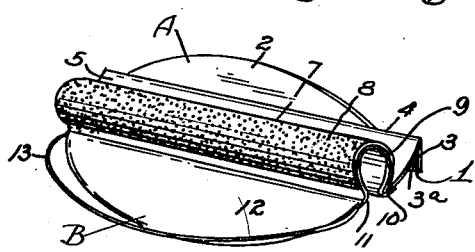
Fig. 6 is an assembled view of the perch in perspective.

The perch consists of two separable telescopic sections A, B of resilient material such as tin, plastic, or the like, the section A having a narrow portion 1, V-shape in cross section, one side 2 of which extends beyond the opposite side 3 and is yieldingly curved away therefrom, the side 3 at its upper edge 4 being bent downwardly and away from the side 3 to form therewith an inverted relatively wide V, 3a, the side 5 from its lowermost edge 6 being bent upwardly and rounded to form the elongated portion 7 that is open-ring shape in cross section. Adhered to the elongated rounded porton 7, as by gluing, and extending almost from end to end thereof is the paper covering 8 that is roughened to form, together with said portion 7, a foot rest for the bird.

The section B of the perch is formed with an elongated portion 9, open-ring shape in cross section, slightly smaller than and snugly but adjustably and removably received in the corresponding portion 7 of the section A, the portion 9 having one edge extended outwardly to form the elongated lip 10 that is bent upwardly embracing a portion of the side 5 of the section A. Directly opposite the lip 10 the edge 11 of portion 9 is extended obliquely downwardly to form the pan 12 provided with the upturned rim 13.

The application of the perch to the bead 14 of the frame 15 of the mirror 16, Fig. 1, serves as a support for the perch. The bead 14 is received in and engaged in vice-like grip by the V, 3a of the resilient perch section A, the extent and angle of the side 2 being such that it frictionally engages the lower surface of the mirror 16 and the perch is then so supported that it is firm and free from vibration when the bird 17 lights thereupon or takes off therefrom. This is important as vibration of the perch tends to annoy the bird and would prevent him from becoming quickly accustomed to the perch. In order for the bird to see his reflection in the mirror he must face the same while standing upon the perch and in this position his tail is disposed over and above the pan 12 of the perch and will receive any droppings.

What is claimed is:

1. In a bird perch, an inverted V-shaped resilient portion adapted to receive and grip the bead of a beaded framed mirror, a resilient V-shaped portion integral therewith and having one side of the V extending upwardly outwardly and adapted to engage said mirror when said inverted V-shaped portion is in engagement with said bead, a pan located a distance from said mirror with respect to said inverted V-shaped portion, cooperating interfitting portions adjustably connected to each other and connecting said pan to said inverted V-shaped portion, and a roughened foot rest portion carried by one of said interfitting portions.

2. In a bird perch, a resilient portion adapted to receive and grip the bead of a beaded framed mirror, a resilient portion integral with said first named portion and having a side member extending upwardly and away from said first named portion and engaging said mirror when said first named portion is in engagement with said bead, a pan, and complementarily formed telescopically engaging separable members connecting said pan to said first named portion.

3. In a bird perch, adjustably connected separable telescoping sections, one section including a resilient portion adapted to receive and grip the bead of a beaded object, a lip co-extensive with one edge of one of said sections and embracing and formed complementary to the other section at the point of engagement therewith, a pan carried by the other of said telescopic sections, and a foot rest carried by said first named telescopic section.

4. In a bird perch, adjustably connected separable telescopic sections, one section including a resilient portion adapted to receive and grip the bead of a beaded mirror, an extension member diverging from said resilient portion engaging said mirror when said resilient portion engages said bead, a lip co-extensive with one edge of one of said sections and embracing and formed complementary to the other section at the point of engagement therewith, and a foot rest carried by one of said sections.

5. In a bird perch, an inverted V-shaped resilient portion adapted to receive and grip the bead of a beaded framed mirror, a resilient V-shaped portion integral therewith adapted to engage said mirror when said inverted V-shaped portion is in engagement with said bead, one side of said inverted V-shaped portion extended and forming an elongated rounded portion, a pan located in greater spaced relation to said mirror than said inverted V-shaped portion, an extension of one edge of said pan formed complementary to and adjustably and removably received in said elongated rounded portion for support thereby, and a lip terminating said pan edge extension embracing one side of said inverted V-shaped portion.

References Cited in the file of this patent

UNITED STATES PATENTS

| Number | Name | Date |
|---|---|---|
| D. 166,334 | Moon | Apr. 1, 1952 |
| D. 167,326 | Verosub et al. | July 22, 1952 |
| 992,167 | Cousin | May 16, 1911 |
| 1,758,674 | Morton | May 13, 1930 |
| 2,076,734 | Leindorf | Apr. 13, 1937 |
| 2,221,840 | Little | Nov. 19, 1940 |